United States Patent
Ishiuchi et al.

(10) Patent No.: US 11,873,399 B2
(45) Date of Patent: Jan. 16, 2024

(54) RESIN COMPOSITION, POLISHING PAD, AND METHOD FOR PRODUCING POLISHING PAD

(71) Applicant: SHOWA DENKO K.K., Tokyo (JP)

(72) Inventors: Ryujin Ishiuchi, Tokyo (JP); Nobuyuki Takahashi, Tokyo (JP)

(73) Assignee: Resonac Corporation, Tokyo (JP)

( * ) Notice: Subject to any disclaimer, the term of this patent is extended or adjusted under 35 U.S.C. 154(b) by 399 days.

(21) Appl. No.: 16/977,719

(22) PCT Filed: Jan. 21, 2019

(86) PCT No.: PCT/JP2019/001706
§ 371 (c)(1),
(2) Date: Sep. 2, 2020

(87) PCT Pub. No.: WO2019/225055
PCT Pub. Date: Nov. 28, 2019

(65) Prior Publication Data
US 2021/0054192 A1   Feb. 25, 2021

(30) Foreign Application Priority Data

May 22, 2018 (JP) ................ 2018-097985

(51) Int. Cl.
| | |
|---|---|
| *C08L 67/07* | (2006.01) |
| *B24B 37/24* | (2012.01) |
| *C08L 33/10* | (2006.01) |
| *B24D 18/00* | (2006.01) |
| *C08F 283/01* | (2006.01) |
| *C08F 290/06* | (2006.01) |
| *C08L 51/08* | (2006.01) |

(52) U.S. Cl.
CPC ............. *C08L 67/07* (2013.01); *B24B 37/24* (2013.01); *C08L 33/10* (2013.01)

(58) Field of Classification Search
None
See application file for complete search history.

(56) References Cited

U.S. PATENT DOCUMENTS

2003/0099819 A1* 5/2003 Schroder ............. C08G 18/672
428/212

FOREIGN PATENT DOCUMENTS

| | | | |
|---|---|---|---|
| JP | 06256721 A | * | 9/1994 |
| JP | 2006-035322 A | | 2/2006 |
| JP | 2009143985 A | * | 7/2009 |
| JP | 2012-000714 A | | 1/2012 |
| KR | 2012021719 A | * | 3/2012 |

OTHER PUBLICATIONS

International Search Report for PCT/JP2019/001706 dated Apr. 23, 2019 [PCT/ISA/210].
Written Opinion for PCT/JP2019/001706 dated Apr. 23, 2019 [PCT/ISA/237].

* cited by examiner

*Primary Examiner* — Randy P Gulakowski
*Assistant Examiner* — Ha S Nguyen
(74) *Attorney, Agent, or Firm* — Sughrue Mion, PLLC

(57) ABSTRACT

Provided are: a resin composition for easily giving polishing pads which have a hardness suitable for chemical mechanical polishing and have voids of a desired size; a polishing pad produced from the resin composition; and a method for producing the polishing pad. The resin composition comprises a urethane (meth)acrylate (A), at least one unsaturated resin (B) selected from among vinyl ester resins and unsaturated polyester resins, an ethylenically unsaturated compound (C) which has an ethylenically unsaturated bond and is neither the urethane (meth)acrylate (A) nor the unsaturated resin (B), and a hollow object (D), wherein the mass ratio of the content of the urethane (meth)acrylate (A) to the content of the unsaturated resin (B), A:B, is 64:36 to 96:4 and the content of the hollow object (D) is 0.7-9.0 parts by mass per 100 parts by mass of the sum of the urethane (meth)acrylate (A), the unsaturated resin (B), and the ethylenically unsaturated compound (C).

15 Claims, No Drawings

RESIN COMPOSITION, POLISHING PAD, AND METHOD FOR PRODUCING POLISHING PAD

CROSS REFERENCE TO RELATED APPLICATIONS

This application is a National Stage of International Application No. PCT/JP2019/001706 filed Jan. 21, 2019, claiming priority of Japanese Patent Application No. 2018-097985 filed May 22, 2018.

FIELD

The present disclosure relates to a resin composition, a polishing pad, and a method for producing a polishing pad.

BACKGROUND

A polishing sheet, which is a type of polishing pad, is produced by using a nonwoven fabric or knitted woven fabric made of synthetic fibers, synthetic rubber, etc., or a polyester film, etc., as a substrate, applying a polyurethane solution on an upper surface thereof, forming a porous layer having continuous pores by a wet coagulation method, and optionally grinding and removing a skin layer thereof. Such polishing sheets have been widely used as a polishing pad in rough polishing and finishing polishing for surface precision polishing of electronic components, such as liquid crystal glass, glass disks, photomask silicon wafers, CCDs, and cover glasses. In recent years, together with the development of measuring instruments for precision polished surfaces, polishing pads are required for higher quality by users, and thus polishing pads capable of higher precision polishing are demanded.

Conventionally, a chemical mechanical polishing (CMP) method has been employed for planarization of precision components, such as magnetic disc substrates, optical lenses, and semiconductor wafers. In the CMP method, a slurry (polishing liquid) in which abrasive grains (abrasive particles) are dispersed in an alkali solution or an acid solution is usually supplied between a work surface of an object to be polished and a polishing pad. During polishing, the object to be polished is planarized by the mechanical polishing action of the abrasive grains in the slurry and the chemical polishing action of the alkali solution or the acid solution.

In such a CMP method, a polishing pad in which a porous soft polyurethane foam having excellent abrasion resistance is used in a polishing layer is known, particularly as a polishing pad used for finishing polishing. However, in this type of polishing pad, the polishing layer is highly flexible and is easily deformed in compression. Thus, the polishing layer conforms to the edge shape of an object to be polished during polishing to give rise to over-polishing phenomenon, in which the edge of the object to be polished is polished more than the central portion thereof, so-called "edge beveling". In addition, micropores existing in the surface of the polishing layer are partially occluded by friction during the polishing process, resulting in problems, such as occurrence of polishing scratches on the surface to be polished and lowering of the polishing rate over time.

As a technique for preventing edge beveling, it has been studied to increase the hardness of a polishing layer of a polishing pad. For example, Patent Literature 1 describes a polishing fabric in which a resin is impregnated into a nonwoven fabric obtained by mixing polyester fibers with heat fusion yarns. In the literature, a urethane resin is used as a resin for impregnation, and is cured after the impregnation. Patent Literature 2 describes that, in a polishing pad formed of polyurethane foam, the connection between cells is suppressed and the respective cells are separately formed.

CITATION LIST

Patent Literature

[PTL 1] JP 2006-35322 A
[PTL 2] JP 2012-714A

SUMMARY

Technical Problem

In polishing by the CMP method, a material having a very high hardness, such as diamond, is used as abrasive grains. Further, there is typically a variation in the size and shape of abrasive grains. Due to the nature of such abrasive grains, when a polishing pad is too hard, the polishing pad cannot absorb the force applied to some of large abrasive grains or sharp abrasive grains, so that locally excessive load is applied to the surface of an object to be polished, and thus there is a possibility that the surface of the object to be polished is damaged. Therefore, it is desirable that a polishing pad not only have sufficient hardness to suppress the aforementioned edge beveling, but also have flexibility enough to absorb an excessive force applied to abrasive grains.

Furthermore, it has been found that the size and distribution of pores in a polishing pad greatly affect polishing accuracy, and the development of techniques to control them is important.

However, by using the polishing fabric of Patent Literature 1, it is difficult to control the size of pores and the distribution thereof in the manufacturing process. Further, by the method for producing a polishing pad described in Patent Literature 2, it is difficult to control the size of each cell and the variation thereof, and avoid the occurrence of variation in the sizes of the cells included in the polishing pad.

In view of the above problems, the present disclosure provides a resin composition for easily obtaining a polishing pad having a hardness suitable for chemical mechanical polishing and having pores of a desired size, and a polishing pad and a method for producing a polishing pad using the resin composition.

Solution to Problem

The present invention includes the following aspects.
[1] A resin composition comprising:
a urethane (meth)acrylate (A),
an unsaturated resin (B) consisting of at least one of a vinyl ester resin and an unsaturated polyester resin,
an ethylenically unsaturated compound (C) having an ethylenically unsaturated bond and excluding the urethane (meth)acrylate (A) and the unsaturated resin (B), and
a hollow body (D),
wherein the urethane (meth)acrylate (A) is represented by the following general formula,

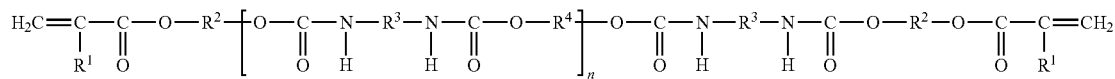

wherein R¹ is H or CH₃, R² is a divalent hydrocarbon group which may contain an ether bond and in which a hydrogen atom may be substituted with a substituent, R³ is a divalent hydrocarbon group, and R⁴ is a structural unit derived from a polyester polyol having a weight-average molecular weight of 2,000 to 8,000, and n, which is the number of repeating units, is an average value based on the number of the entire urethane (meth)acrylate (A) contained in the resin composition and is a real number of 1.00 or greater, wherein a mass ratio A:B of the content of the urethane (meth)acrylate (A) and the content of the unsaturated resin (B) is 64:36 to 96:4, and wherein the content of the hollow body (D) with respect to 100 parts by mass of the total of the urethane (meth)acrylate (A), the unsaturated resin (B) and the ethylenically unsaturated compound (C) is 0.7 to 9.0 parts by mass.

[2] The resin composition according to [1], wherein the hollow body (D) is a resin balloon.

[3] The resin composition according to [1] or [2], wherein the content of the ethylenically unsaturated compound (C) is 40 to 200 parts by mass with respect to 100 parts by mass of the total of the urethane (meth)acrylate (A) and the unsaturated resin (B).

[4] The resin composition according to any one of [1] to [3], wherein the value of n in the general formula is 1.00 to 6.00.

[5] The resin composition according to any one of [1] to [4], wherein R² in the general formula is an alkylene group having 2 to 6 carbon atoms.

[6] The resin composition according to any one of [1] to [5], wherein R³ in the general formula is a cycloalkylene group or arylene group having 5 to 15 carbon atoms.

[7] The resin composition according to any one of [1] to [6], wherein the polyester polyol in R⁴ of the general formula is a condensation product of an aliphatic glycol and an aliphatic dibasic acid.

[8] The resin composition according to any one of [1] to [7], wherein the unsaturated resin (B) is an epoxy (meth)acrylate.

[9] The resin composition according to any one of [1] to [8], wherein the resin composition comprises an inorganic filler excluding the hollow body (D).

[10] The resin composition according to [9], wherein the content of the inorganic filler with respect to 100 parts by mass of the total of the urethane (meth)acrylate (A), the unsaturated resin (B), and the ethylenically unsaturated compound (C) is 10 to 200 parts by mass.

[11] The resin composition according to any one of [1] to [10], wherein the resin composition is a resin composition for a polishing pad.

[12] A polishing pad comprising a cured product of a resin composition described in any one of [1] to [10].

[13] A method for producing a polishing pad comprising the steps of molding and curing a resin composition described in any one of [1] to [10], and scraping a surface of the cured resin composition.

Advantageous Effects of Invention

According to the present disclosure, it is possible to provide a resin composition for easily obtaining a polishing pad having a hardness suitable for chemical mechanical polishing and having pores of a desired size, and a polishing pad and a method for producing a polishing pad using the resin composition.

DESCRIPTION OF EMBODIMENTS

Hereinafter, a resin composition, a polishing pad, and a method for producing a polishing pad of the present invention will be described in detail. Note that the present invention is not limited to only the embodiments described below.

In the following description, "ethylenically unsaturated bond" means a double bond formed between carbon atoms excluding carbon atoms forming an aromatic ring.

"Weight-average molecular weight" and "number-average molecular weight" are values in terms of the standard polystyrene measured by size exclusion chromatography (SEC), e.g., gel permeation chromatography (GPC).

"Median diameter" means a particle diameter corresponding to a 50% cumulative particle diameter in the volume-based particle size distribution determined by a laser diffraction and scattering method.

"(Meth)acrylate" means acrylate or methacrylate, and "(meth)acryl" means acryl or methacryl.

<1. Resin Composition>

A resin composition according to an embodiment includes a urethane (meth)acrylate (A), an unsaturated resin (B) consisting of at least one of a vinyl ester resin and an unsaturated polyester, an ethylenically unsaturated compound (C) having an ethylenically unsaturated bond and excluding the urethane (meth)acrylate (A) and the unsaturated resin (B), and a hollow body (D). The mixing ratio of the urethane (meth)acrylate (A) to the unsaturated resin (B) and the content of the hollow body (D) will be described later in Sections 1-3 and 1-5, respectively. Hereinafter, each component contained in the resin composition of the present embodiment will be described.

<1-1. Urethane (Meth)Acrylate (A)>

The urethane (meth)acrylate (A) is represented by the following general formula:

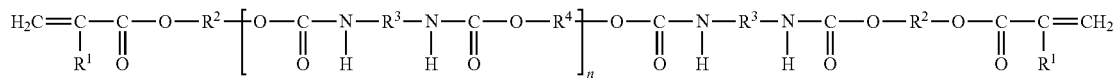

In the above general formula, R¹ is H or CH₃, R² is a divalent hydrocarbon group which may contain an ether bond and in which a hydrogen atom may be substituted with a substituent, R³ is a divalent hydrocarbon group, and R⁴ is a structural unit derived from a polyester polyol having a weight-average molecular weight of 2,000 to 8,000, and n, which is the number of repeating units, is an average value based on the number of the entire urethane (meth)acrylate (A) contained in the resin composition and is a real number of 1.00 or greater.

In the above general formula, $R^1$ is H or $CH_3$, and H is preferred.

In the above general formula, $R^2$ is a divalent hydrocarbon group which may contain an ether bond and in which a hydrogen atom may be substituted with a substituent. Examples of the hydrocarbon group as $R^2$ include an alkylene group, a cycloalkylene group, and an arylene group, and these hydrocarbon groups may be branched. $R^2$ is preferably an alkylene group having 2 to 6 carbon atoms, or an alkylene group having 2 to 6 carbon atoms in which a hydrogen atom is substituted with a substituent, such as a phenyl group, a phenoxy group, or a (meth)acryloyloxy group. It is particularly preferable that $R^2$ be an ethylenic group.

$R^1$ and $R^2$ are structures derived from a hydroxy group-containing (meth)acrylate $CH_2=C(R^1)C(O)OR^2OH$. Examples of the hydroxy group-containing (meth)acrylate $CH_2=C(R^1)C(O)OR^2OH$, include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, phenoxyhydroxypropyl acrylate, phenoxyhydroxypropyl methacrylate, trimethylolpropane diaciylate, trimethylolpropane dimethacrylate, dipropylene glycol monoacrylate, and dipropylene glycol monomethacrylate. These hydroxy group-containing (meth)acrylates may be used alone or in combination of two or more thereof. The hydroxy group-containing (meth)acrylate is preferably 2-hydroxyethyl acrylate, 2-hydroxyethyl methacrylate, 2-hydroxypropyl acrylate, 2-hydroxypropyl methacrylate, 2-hydroxybutyl acrylate, or 2-hydroxybutyl methacrylate, more preferably 2-hydroxyethyl acrylate, 2-hydroxypropyl acrylate, or 2-hydroxybutyl acrylate, and further preferably 2-hydroxyethyl acrylate.

In the above general formula, $R^3$ is a divalent hydrocarbon group. It is preferable that $R^3$ contain from 5 to 15 carbon atoms. The hydrocarbon group as $R^3$ is preferably a cycloalkylene group or an arylene group. In these groups, a hydrogen atom may be substituted with an alkyl group.

$R^3$ is a structure derived from a diisocyanate compound OCN—$R^3$—NCO. Examples of the diisocyanate compound OCN—$R^3$—NCO include isophorone diisocyanate, tolylene diisocyanate, diphenylmethane diisocyanate, hydrogenated diphenylmethane diisocyanate, hexamethylene diisocyanate, xylylene diisocyanate, and hydrogenated xylylene diisocyanate. These diisocyanate compounds may be used alone or in combination of two or more thereof. The diisocyanate compound is preferably isophorone diisocyanate, tolylene diisocyanate, xylylene diisocyanate, or hydrogenated xylylene diisocyanate, and more preferably isophorone diisocyanate.

In the above general formula, $R^4$ is a structural unit derived from a polyester polyol HO—$R^4$—OH having a weight-average molecular weight of 2,000 to 8,000. The polyester polyol HO—$R^4$—OH is, for example, a condensation product obtained by a condensation reaction of a glycol and a dibasic acid. The glycol is preferably aliphatic, more preferably one having a hydroxy group at each terminal of a linear hydrocarbon, and among these, further preferably one having no unsaturated bond. Examples of the glycol include ethylene glycol, propylene glycol, dipropylene glycol, and hexanediol, and ethylene glycol is particularly preferred. The dibasic acid is preferably aliphatic, and more preferably aliphatic having no branched and cyclic structure. Examples of the dibasic acid include oxalic acid, fumaric acid, succinic acid, adipic acid, and sebacic acid, and adipic acid is particularly preferred. Both of the aliphatic glycol and the aliphatic dibasic acid can increase the elongation ratio of the urethane (meth)acrylate (A) to improve the toughness of an obtained molded article.

The lower limit of the weight-average molecular weight of the polyester polyol is 2,000. This can increase the elongation ratio of the urethane (meth)acrylate (A) to improve the toughness of an obtained molded article. From this viewpoint, the weight-average molecular weight of the polyester polyol is preferably 3,000 or greater, and more preferably 4,000 or greater.

The upper limit of the weight-average molecular weight of the polyester polyol is 8,000. This enables to obtain a molded article having sufficient strength. From this viewpoint, the weight-average molecular weight of the polyester polyol is preferably 7,000 or less, and more preferably 6,000 or less. Note that, as described above, the weight-average molecular weight is a value in terms of polystyrene by size exclusion chromatography.

In the above general formula, n is the number of repeating units in a square bracket in the above general formula, and n is a real number of 1.00 or greater. The value of n is determined based on the number-average molecular weight $M_{nA}$ of the urethane (meth)acrylate (A) contained in the resin composition, as follows, for example: When the molecular weight of a moiety outside the square bracket in the above general formula is $M_1$ and the molecular weight of the unit within the square bracket is $M_2$, the value of n is obtained from $M_{nA}=M_1+nM_2$. Here, $M_2$ is based on the number-average molecular weight of the polyester polyol. Note that, as can be understood from the fact that n is based on the number-average molecular weight, n is an average value based on the number of the entire urethane (meth)acrylate (A), and is not limited to an integer.

The value of n is preferably 6.00 or less. When the value of n is 6.00 or less, an increase in viscosity of the urethane (meth)acrylate (A) is suppressed, and good workability can be secured. From this viewpoint, the value of n is more preferably 5.00 or less, and further preferably 4.00 or less.

As a method for producing the urethane (meth)acrylate (A), for example, there is a method in which a diisocyanate compound OCN—$R^3$—NCO and a polyester polyol HO—$R^4$—OH are reacted to synthesize a molecule having an isocyanato group at each terminal, and a hydroxy group-containing (meth)acrylate $CH_2=C(R^1)C(O)OR^2OH$ is reacted with the molecule. In the step of synthesizing a molecule having an isocyanato group at each terminal, it is preferable that the diisocyanate compound be added in excess to the polyester polyol, that is, so that the molar ratio of the NCO group/OH group exceeds one.

<1-2. Unsaturated Resin (B)>

The unsaturated resin (B) consists of at least one of a vinyl ester resin and an unsaturated polyester. In other words, the unsaturated resin (B) is any one of those consisting of a vinyl ester resin, those consisting of an unsaturated polyester, and those consisting of a vinyl ester resin and an unsaturated polyester.

[1-2-1. Vinyl Ester Resin]

The vinyl ester resin is preferably an epoxy (meth)acrylate obtained by esterifying an epoxy resin with an α,β-unsaturated monocarboxylic acid.

Examples of the epoxy resin include diglycidyl ethers of a bisphenol, such as bisphenol A, bisphenol AD, and bisphenol F, and high molecular weight homologs thereof, phenol novolak type polyglycidyl ethers, and cresol novolak type polyglycidyl ethers. In the synthesis process, a product obtained by reacting a phenol compound, such as bisphenol A, bisphenol AD, bisphenol F, or bisphenol S, with a glycidyl ether thereof, or an aliphatic epoxy resin may be used. Among these, it is preferable that a bisphenol A type epoxy resin be used, since a vinyl ester resin capable of providing a cured product excellent in mechanical strength and chemical resistance can be obtained.

Examples of the α,β-unsaturated monocarboxylic acid include acrylic acid and methacrylic acid. As the α,β-unsaturated monocarboxylic acid, crotonic acid, tiglic acid, cinnamic acid, etc., may also be used. Among these, it is preferable that (meth)acrylic acid be used, since a vinyl ester resin capable of providing a cured product excellent in mechanical strength and chemical resistance can be obtained.

As a preferred synthetic example of the epoxy (meth) acrylate, there is a method in which a diglycidyl ether of bisphenol A and an α,β-unsaturated monocarboxylic acid are esterified at a ratio of carboxy group/epoxy group=1.05 to 0.95 at 80° C. to 140° C. Further, a catalyst can optionally be used. Examples of the catalyst include tertiary amines, such as benzyldimethylamine, triethylamine, N,N-dimethylaniline, triethylenediamine, and 2,4,6-tris(dimethylaminomethyl)phenol; quaternary ammonium salts, such as trimethylbenzylammonium chloride; and metal salts, such as lithium chloride.

The weight-average molecular weight of the vinyl ester resin is preferably 1,000 to 6,000, more preferably 1,000 to 5,000, and further preferably 1,000 to 4,000. When the weight-average molecular weight of the vinyl ester resin is 1,000 to 6000, moldability of the resin composition is further improved. Note that, as described above, the weight-average molecular weight is a value in terms of polystyrene by size exclusion chromatography.

[1-2-2. Unsaturated Polyester Resin]

The unsaturated polyester resin is obtained by polycondensing a polyhydric alcohol and an unsaturated polybasic acid and optionally a saturated polybasic acid, and the type thereof is not particularly limited. The unsaturated polybasic acid is a polybasic acid having an ethylenically unsaturated bond, and the saturated polybasic acid is a polybasic acid having no ethylenically unsaturated bond. The unsaturated polyester resin may be alone or two or more kinds thereof.

Examples of the polyhydric alcohol include ethylene glycol, propylene glycol, butanediol, diethylene glycol, dipropylene glycol, triethylene glycol, pentanediol, hexanediol, neopentanediol, hydrogenated bisphenol A, bisphenol A, and glycerin. Among these, propylene glycol and hydrogenated bisphenol A are preferred. The polyhydric alcohol may be used alone or in combination of two or more thereof.

Examples of the unsaturated polybasic acid include maleic acid, maleic anhydride, fumaric acid, citraconic acid, and itaconic acid. The unsaturated polybasic acid may be used alone or in combination of two or more thereof. Among these, maleic anhydride and fumaric acid are preferred.

Examples of the saturated polybasic acid include phthalic acid, phthalic anhydride, isophthalic acid, terephthalic acid, het acid, succinic acid, adipic acid, sebacic acid, tetrachlorophthalic anhydride, tetrabromophthalic anhydride, and endomethylenetetrahydrophthalic anhydride. Among them, phthalic acid is preferred. The saturated polybasic acid may be used alone or in combination of two or more thereof.

The weight-average molecular weight of the unsaturated polyester resin is preferably 6,000 to 35,000, more preferably 6,000 to 20,000, and further preferably 8,000 to 15,000. When the weight-average molecular weight is 6,000 to 35,000, moldability of the resin composition is further improved. Note that, as described above, the weight-average molecular weight is a value in terms of polystyrene by size exclusion chromatography.

The unsaturation degree of the unsaturated polyester resin is preferably 50 to 100 mol %, more preferably 60 to 100 mol %, and further preferably 70 to 100 mol %. When the unsaturation degree is within the above range, moldability of the resin composition is further improved. The unsaturation degree of the unsaturated polyester resin can be calculated by the following formula using the numbers of moles of the unsaturated polybasic acid and the saturated polybasic acid used as raw materials.

Unsaturation degree (mol %)=[(number of moles of unsaturated polybasic acid)/(number of moles of unsaturated polybasic acid+number of moles of saturated polybasic acid)]×100

<1-3. Blending Ratio of Urethane (Meth)Acrylate (A) and Unsaturated Resin (B)>

In order for a polishing pad to absorb excessive force applied on abrasive grains, it is desirable that a cured product of the resin composition not be too hard. In this regard, the higher the content of the urethane (meth)acrylate (A) with respect to the content of the unsaturated resin (B), the lower the hardness of the resin composition after curing. Therefore, a mass ratio A:B of the content of the urethane (meth)acrylate (A) and the content of the unsaturated resin (B) contained in the resin composition is 64:36 or greater (that is, A/B is 64/36 or greater), preferably 68:32 or greater (that is, A/B is 68/32 or greater), and more preferably 70:30 or greater (that is, A/B is 70/30 or greater).

In order to obtain a polishing pad capable of suppressing edge beveling in an object to be polished, it is preferable that a cured product of the resin composition be hard. In this regard, the smaller the content of the urethane (meth)acrylate (A) with respect to the content of the unsaturated resin (B), the higher the hardness of the resin composition after curing. In order to provide a cured product of the resin composition with sufficient hardness, a mass ratio A:B of the content of the urethane (meth)acrylate (A) and the content of the unsaturated resin (B) is 96:4 or less (that is, A/B is 96/4 or less), preferably 94:6 or less (that is, A/B is 94/6 or less), and more preferably 90:10 or less (that is, A/B is 90/10 or less).

<1-4. Ethylenically Unsaturated Compound (C)>

As the ethylenically unsaturated compound (C), any compound having an ethylenically unsaturated bond copolymerizable with at least one of the urethane (meth)acrylate (A) and the unsaturated resin (B) can be used without any particular limitation, and the ethylenically unsaturated compound (C) is preferably copolymerizable with both of the urethane (meth)acrylate (A) and the unsaturated resin (B).

Examples of the ethylenically unsaturated compound (C) include aromatic monomers, such as styrene, vinyltoluene, and divinylbenzene; acrylate monomers, such as 2-hydroxyethylmethacrylate, diacrylates of polyalkyleneoxides, triethylene glycol di(meth)acrylate, tetraethylene glycol di(meth)acrylate, tripropylene glycol di(meth)acrylate, and methyl methacrylate; and oligomers in which a plurality of the above monomers are bonded. Among these, from the viewpoint of reactivity with the urethane (meth)acrylate (A) and the unsaturated resin (B), styrene and methyl methacrylate are preferred, and styrene is particularly preferred. As the ethylenically unsaturated compound (C), the above compound may be used alone or in combination of two or more thereof.

The content of the ethylenically unsaturated compound (C) is preferably 40 parts by mass or more with respect to 100 parts by mass of the total of the urethane (meth)acrylate (A) and the unsaturated resin (B). This can make the resin composition have a viscosity for easy handling. From this viewpoint, the content of the ethylenically unsaturated compound (C) is more preferably 50 parts by mass or more, and further preferably 60 parts by mass or more.

The content of the ethylenically unsaturated compound (C) is preferably 200 parts by mass or less with respect to 100 parts by mass of the total of the urethane (meth)acrylate (A) and the unsaturated resin (B). This can increase the mechanical strength of the resin composition after curing. From this viewpoint, the content of the ethylenically unsaturated compound (C) is more preferably 150 parts by mass or less, and further preferably 120 parts by mass or less.

<1-5. Hollow Body (D)>

The hollow body (D) is a particle having a cavity therein. After curing of the resin composition as described later, the surface of the hollow body (D) is removed by scraping and surfacing the surface of this cured product, to form pores derived from the hollow body (D) in the surface of the cured product (e.g., a polishing pad). When the cured product is used as the polishing layer of the polishing pad, the pores derived from the hollow body (D) present in the surface of the polishing layer serve to retain the abrasive grains (hereinafter also referred to as "abrasive particles") contained in the polishing agent. By appropriately selecting the size of the hollow body (D) contained in the resin composition and the distribution thereof, it is possible to precisely and easily control the size of the pores present in the surface of the polishing pad prepared using the resin composition and the distribution thereof.

The size of the hollow body (D) is preferably 50 μm or greater in median diameter. This ensures that the abrasive particles are retained in the pores. From this viewpoint, the median diameter of the hollow body (D) is more preferably 60 μm or greater, and further preferably 70 μm or greater.

The size of the hollow body (D) is preferably 200 μm or less in median diameter. As a result, the amount of abrasive grains retained in one pore can be limited, and the deterioration of the abrasiveness can be suppressed. From this viewpoint, the median diameter of the hollow body (D) is more preferably 150 μm or less, and further preferably 120 μm or less.

The narrower the distribution of the sizes of the hollow bodies (D), the narrower the distribution of the sizes of the pores formed in the polishing pad produced using the resin composition. The narrower the pore size distribution, the more even the amount that the abrasive grains retained in the pores sink thereinto, i.e., the more even the amount by which the abrasive grains protrude from the surface of the polishing pad, and as a result, the more even the load on an object to be polished. From this viewpoint, the standard deviation of the particle diameter based on the number of hollow bodies (D) is preferably 20.0 μm or less, more preferably 10.0 μm or less, and further preferably 8.0 μm or less. The standard deviation of the particle diameter based on the number of hollow bodies (D) is calculated based on a predetermined number of values of particle diameters obtained by measuring the particle diameter of a predetermined number or more of hollow bodies (D) using a visual observation apparatus, such as a microscope. As the predetermined number, 30 or more are preferable, in view of statistics.

However, the size of the hollow body (D) and the distribution thereof are not limited to the above, and can be appropriately designed according to the type of the abrasive used, the specification for the polishing process, etc. The shape of the hollow body (D) is generally spherical, but can be appropriately selected according to the type of abrasive used, the specification for the polishing process, etc.

Examples of a material for the hollow body (D) include glass balloons, silica balloons, alumina balloons, ceramic balloons, shirasu balloons, and resin balloons, and among these, resin balloons are preferred. Examples of a resin for forming the resin balloons include thermosetting resins, such as phenol resins, epoxy resins, and urea resins, and thermoplastic resins, such as polystyrene, polyvinylidene chloride, and acrylonitrile resins.

In order to suppress the formation of scratches on the surface of an object to be polished, it is desirable to disperse the load applied to the surface of the object to be polished. For this purpose, it is desirable to form a sufficient number of pores in the surface of the polishing pad to retain the abrasive particles. As the added amount of the hollow body (D) contained in the resin composition increases, the number of pores in the surface of the polishing pad increases. Therefore, in the resin composition, the content of the hollow body (D) with respect to 100 parts by mass of the total of the urethane (meth)acrylate (A), the unsaturated resin (B), and the ethylenically unsaturated compound (C) is 0.7 parts by mass or more. From this viewpoint, the content of the hollow body (D) is preferably 1.0 parts by mass or more, and more preferably 2.0 parts by mass or more.

In the resin composition, the content of the hollow body (D) with respect to 100 parts by mass of the total of the urethane (meth)acrylate (A), the unsaturated resin (B), and the ethylenically unsaturated compound (C) is 9.0 parts by mass or less. This can ensure sufficient hardness in a polishing pad prepared using the resin composition. From this viewpoint, the content of the hollow body (D) is preferably 7.0 parts by mass or less, and more preferably 5.0 parts by mass or less.

<1-6. Other Ingredients>

In addition to the respective components (A) to (D) described above, the resin composition may contain additives, such as an inorganic filler other than the hollow body (D), a curing agent, a curing accelerator, a low shrinkage agent, a mold release agent, a thickener, a colorant, and a polymerization inhibitor, if necessary, and the type of the additive is not limited thereto. These additives may be contained within a range that does not interfere with the effect of the present invention depending on the respective purpose. The specific added amount of the additive is preferably in such a range that the total content of the urethane (meth)acrylate (A), the unsaturated resin (B), and the ethylenically unsaturated compound (C) in the resin composition is 25.0% by mass or greater, more preferably 35.0% by mass or greater, and further preferably 45.0% by mass or greater.

The inorganic filler is selected according to a function required, for example, a function of adjusting the viscosity of the resin composition to a viscosity suitable for handling, and a function of improving moldability of the resin composition. Examples of the inorganic filler include aluminum hydroxide, barium sulfate, talc, kaolin, calcium sulfate, calcium carbonate, magnesium oxide, magnesium hydroxide, calcium hydroxide, and calcium oxide. Among these, calcium carbonate, aluminum hydroxide and talc are preferred since they are inexpensive, and calcium carbonate and aluminum hydroxide are more preferred. As the inorganic filler, the above materials may be used alone or in combination of two or more thereof.

The median diameter of the inorganic filler is preferably 1 to 100 μm, more preferably 1 to 60 μm, and further preferably 1 to 50 μm, from the viewpoint of the viscosity of the resin composition when forming a cured product of the resin composition. The larger the median diameter of the inorganic filler, the more the aggregation of the particles can be suppressed.

Therefore, the median diameter of the inorganic filler is preferably 1 μm or greater. On the other hand, the smaller the median diameter of the inorganic filler, the better the moldability of the resin composition. Therefore, the median diameter of the inorganic filler is preferably 100 μm or less, more preferably 60 μm or less, and further preferably 50 μm or less.

The shape of the inorganic filler may be spherical, flat, or the like, but is preferably spherical. When the inorganic filler is a spherical particle, the specific surface area is small, so that the viscosity of the resin composition when forming a cured product of the resin composition can be effectively reduced. If the viscosity of the resin composition is low, when molding of the resin composition is carried out by using a mold, the resin composition can be sufficiently filled in the mold.

As the content of the inorganic filler is larger, the viscosity of the resin composition is higher, and as a result, separation of the hollow body (D) caused by the difference in specific gravity from other components can be suppressed, and moldability of the resin composition is improved. From this viewpoint, the content of the inorganic filler with respect to 100 parts by mass of the total of the urethane (meth)acrylate (A), the unsaturated resin (B), and the ethylenically unsaturated compound (C) is preferably 10 parts by mass or more, more preferably 20 parts by mass or more, and further preferably 30 parts by mass or more.

The smaller the content of the inorganic filler, the more the number of pores retaining the abrasive particles can be increased. From this viewpoint, the content of the inorganic filler with respect to 100 parts by mass of the total of the urethane (meth)acrylate (A), the unsaturated resin (B), and the ethylenically unsaturated compound (C) is preferably 200 parts by mass or less, more preferably 100 parts by mass or less, and further preferably 80 parts by mass or less.

Examples of the curing agent include peroxides, such as diacyl peroxides, peroxy esters, hydroperoxides, dialkyl peroxides, ketone peroxides, peroxy ketals, alkyl peresters, and percarbonates. Among these peroxides, t-butyl peroxyoctoate, benzoyl peroxide, 1,1-di-t-butyl-peroxy-3,3,5-trimethylcyclohexane, t-butyl peroxyisopropyl carbonate, t-butyl peroxybenzoate, dicumyl peroxide, and di-t-butyl peroxide are preferred. These curing agents may be used alone or in combination of two or more thereof. The added amount of the curing agent is preferably 0.5 to 2.0 parts by mass, and more preferably 0.6 to 1.5 parts by mass, with respect to 100 parts by mass of the total of the urethane (meth)acrylate (A), the unsaturated resin (B), and the ethylenically unsaturated compound (C).

Examples of the curing accelerator include metal soaps, such as cobalt naphthenate, cobalt octylate, zinc octylate, vanadium octylate, copper naphthenate, and barium naphthenate, metal chelates, such as vanadium acetylacetate, cobalt acetylacetate, and iron acetylacetonate, aniline, N,N-substituted anilines, such as N,N-dimethylaniline, N,N-diethylaniline, and N,N-bis(hydroxyethyl)aniline, m-toluidine, p-toluidine, N-ethyl-m-toluidine, N,N-substituted p-toluidines, such as N,N-dimethyl-p-toluidine, N,N-bis(2-hydroxyethyl)-p-toluidine, and N,N-bis(2-hydroxypropyl)-p-toluidine, 4-(N,N-substituted amino)benzaldehydes, such as 4-(N,N-dimethylamino)benzaldehyde, 4-[N,N-bis(2-hydroxyethyl)amino]benzaldehyde, and 4-(N-methyl-N-hydroxyethylamino)benzaldehyde, and amines, such as triethanolamine, diethylenetriamine, pyridine, 4-phenylmorpholine, piperidine, and diethanolaniline, and among these, cobalt octylate is preferred. These curing accelerators may be used alone or in combination of two or more thereof.

As the low shrinkage agent, a thermoplastic resin is preferred, and examples thereof include polystyrene, polyethylene, polymethyl methacrylate, polyvinyl acetate, saturated polyester, and polycaprolactone. The low shrinkage agent may be used alone or in combination of two or more thereof. The added amount of the low shrinkage agent is preferably 10 to 20 parts by mass with respect to 100 parts by mass of the total of the urethane (meth)acrylate (A), the unsaturated resin (B), and the ethylenically unsaturated compound (C).

Examples of the mold release agent include stearic acid, oleic acid, zinc stearate, calcium stearate, aluminum stearate, magnesium stearate, stearamide, oleamide, silicone oil, and synthetic wax. The mold release agent may be used alone or in combination of two or more thereof. The added amount of the mold release agent is preferably 3.0 to 8.0 parts by mass, and more preferably 3.5 to 7.0 parts by mass, with respect to 100 parts by mass of the total of the urethane (meth)acrylate (A), the unsaturated resin (B), and the ethylenically unsaturated compound (C).

The thickener is a compound exhibiting a thickening effect other than the inorganic filler, and an isocyanate compound is exemplified. The thickener may be used alone or in combination of two or more thereof.

The colorant is used when it is necessary to color a molded article, and various kinds of inorganic pigments or organic pigments can be used. The use amount of the colorant can be appropriately adjusted depending on the degree of coloring of the desired molded article.

Examples of the polymerization inhibitor include, but are not limited to, hydroquinone, trimethylhydroquinone, p-benzoquinone, naphthoquinone, t-butylhydroquinone, catechol, p-t-butylcatechol, and 2,6-di-t-butyl-4-methylphenol.

The resin composition preferably does not contain inorganic fibers. Examples of the inorganic fibers include glass fibers, carbon fibers, and metal fibers. When an inorganic fiber is contained in the resin composition, when a cured product of the resin composition is used as a polishing pad, a polishing scratch may occur on an object to be polished.

Here, "not containing an inorganic fiber" means that the content of the inorganic fiber in the resin composition and the cured product thereof is 0.1% by mass or less, and is not intended to exclude the inorganic fiber which is mixed together with other components, such as impurities.

<2. Method for Producing Resin Composition>

The resin composition can be produced by mixing the urethane (meth)acrylate (A), the unsaturated resin (B), the ethylenically unsaturated compound (C), the hollow body (D), and, if necessary, the additive. Examples of the mixing method include kneading. There is no particular limitation on the kneading method, and for example, a disper, a planetary mixer, a kneader, etc., can be used. The kneading temperature is preferably 5° C. to 40° C., and more preferably 10° C. to 30° C.

There is no particular limitation on the order in which each component is mixed in producing the resin composition. For example, when a part or all of the urethane (meth)acrylate (A), the unsaturated resin (B), and the ethylenically unsaturated compound (C) are mixed and then the other components are mixed, a resin composition in which each component is sufficiently dispersed or uniformly mixed is easily obtained, which is preferable. At least a part of the ethylenically unsaturated compound (C) may be mixed in advance with the urethane (meth)acrylate (A) or the unsaturated resin (B), which serves as a solvent or dispersion medium.

<3. Method for Producing Polishing Pad>

A polishing pad can be produced by a step of molding and curing the resin composition and a step of scraping the surface of the cured resin composition.

The step of molding and curing the resin composition is not particularly limited, and for example, there is a method of opening a mold and pouring the resin composition into the mold, or a method of depressurizing a mold or applying pressure from the outside of a mold, as typified by injection molding, and injecting the resin composition into the closed mold from the outside through a hole provided in the mold, such as a spool. The condition for curing the resin composition in the mold can be appropriately set depending on the material used, and a preferred condition includes, for example, a temperature of 10 to 40° C., and a curing time of 1 to 60 minutes. Another preferred condition includes curing at a temperature of 10 to 40° C. and a curing time of 1 to 4 hours, followed by further curing at a temperature of 60 to 150° C. and a curing time of 1 to 4 hours.

By the step of scraping the surface of the cured resin composition, the outer wall of the hollow body (D) existing in the surface of the cured product of the resin composition can be removed, thereby forming pores derived from the cavities of the hollow body (D) in the surface of the cured product of the resin composition, that is, surfacing the surface of the cured product of the resin composition. A planar polisher can be used for this step.

When the hardness of the polishing pad is 10 or greater in Barcol hardness, the deformation of the polishing pad can be suppressed, thereby reducing polishing beveling at the edge of an object to be polished. From this viewpoint, the Barcol hardness of the polishing pad is preferably 15 or greater, and more preferably 20 or greater. When the hardness of the polishing pad is 40 or less in Barcol hardness, in polishing by the CMP method, local load on the surface of an object to be polished due to variations in the size of abrasive grains can be suppressed. From this viewpoint, the Barcol hardness of the polishing pad is preferably 33 or less, and more preferably 30 or less.

When the number of pores in the surface of the polishing pad is 13 pores per $mm^2$ or more, load applied to the surface of an object to be polished can be dispersed thereby suppressing the formation of scratches on the surface of the object to be polished. From this viewpoint, the number of pores in the surface of the polishing pad is preferably 30 pores per $mm^2$ or more, and more preferably 45 pores per $mm^2$ or more. When the number of pores in the surface of the polishing pad is 100 pores per $mm^2$ or less, the polishing pad can ensure sufficient hardness. From this viewpoint, the number of pores in the surface of the polishing pad is preferably 80 pores per $mm^2$ or less, and more preferably 70 pores per $mm^2$ or less. Note that the number of pores in the surface of the polishing pad is obtained by counting the number of pores existing within a predetermined area by using a visual observation apparatus, such as a microscope, and dividing the counted number of pores by the area within which the pores are to be counted.

EXAMPLES

Hereinafter, the present invention will be described in more detail with reference to the examples. Note that the present invention is not limited to the following examples.

<1. Method For Determining Weight-Average Molecular Weight And Number-Average Molecular Weight>

The weight-average molecular weight and the number-average molecular weight of the polymer used in the examples and comparative examples were measured by GPC and determined using a standard polystyrene calibration curve. Measurement apparatus and conditions are as follows.

Apparatus: Shodex (registered trademark) GPC-101 manufactured by Showa Denko K.K.
Column: KF-805 manufactured by Showa Denko K.K.
Column temperature: 40° C.
Sample: 0.2% by mass solution of polymer in tetrahydrofuran
Flow rate: 1 mL/min
Eluent: tetrahydrofuran
Detector: RI-715

<2. Components>

<2-1. Urethane (Meth)Acrylate (A)>

To a 1 L four-necked flask equipped with a stirrer, a reflux condenser, a gas introduction tube and a thermometer, 660 g (0.30 mol) of polyester polyol, 227 g (2.17 mol) of styrene (manufactured by Asahi Kasei Corporation) and 0.17 g of hydroquinone were charged, and the mixture was heated to 80° C. The polyester polyol used here was a polymer obtained from a condensation reaction of adipic acid and ethylene glycol, and had a number-average molecular weight of 2,200 and a weight-average molecular weight of 5,000.

Then, 88 g (0.40 mol) of isophorone diisocyanate was added dropwise to the above four-necked flask over a period of 1.5 hours with stirring to produce a prepolymer having an isocyanato group at a terminal thereof. Further, 18 g (0.16 mol) of 2-hydroxylethylacrylate was added dropwise over a period of 0.5 hours, and then reacted until an absorption peak of the isocyanato group disappeared in the infrared absorption spectrum to obtain a urethane acrylate (A-1) solution having a urethane acrylate (A-1) solid content of 50% by mass. The number-average molecular weight of the urethane acrylate (A-1) was 4,000, and the weight-average molecular weight thereof was 20,000.

Here, the value of n will be calculated. Based on the raw materials used for synthesizing the urethane acrylate (A-1), the molecular weight $M_1$ outside the square bracket in the general formula representing the urethane (meth)acrylate (A) is 455. Since the number-average molecular weight of the polyester polyol is 2,200, the molecular weight $M_2$ in the square bracket is 2,422. As described above, the number-average molecular weight $M_{nA}$ of the urethane acrylate is 4,000, and n=1.46 is calculated from $M_{nA}=M_1+nM_2$.

<2-2. Unsaturated Resin (B)>

[2-2-1. Vinyl Ester Resin]

Ripoxy (registered trademark) R-804 manufactured by Showa Denko K.K. was used, and contained a bisphenol A type vinyl ester resin (B-1) dissolved in styrene (manufactured by Asahi Kasei Corporation) and having a styrene content of 40% by mass.

[2-2-2. Unsaturated Polyester Resin]

To a four-necked flask equipped with a thermometer, a stirrer, an inert gas inlet, and a reflux condenser, 1.16 kg (10 mol) of fumaric acid (manufactured by Kawasaki Kasei Chemicals Ltd.) and 0.76 kg (10 mol) of propylene glycol (manufactured by Asahi Glass Co., Ltd.) were charged. Then, an esterification reaction was carried out by raising the temperature to 200° C. while being heated and stirred under a stream of nitrogen gas to obtain an unsaturated polyester resin (B-2).

The obtained unsaturated polyester resin (B-2) had an unsaturation degree of 100 mol % and a weight-average molecular weight of 12,000.

<2-3. Ethylenically Unsaturated Compound (C)>

Styrene (C-1) was used as the ethylenically unsaturated compound (C), and styrene (manufactured by Asahi Kasei Co., Ltd.) was added in an amount as necessary in addition to that used as a solvent for the urethane (meth)acrylate (A) and a solvent for the unsaturated resin (B).

<2-4. Hollow Body (D)>

As the hollow body (D), a resin balloon having a median diameter of 70 μm (MFL-100MCA manufactured by Matsumoto Yushi-Seiyaku Co., Ltd.) (referred to as resin balloon (D-1)) and a resin balloon having a median diameter of 120 μm (EMC-120 manufactured by Japan Fillite Co., Ltd.) (referred to as resin balloon (D-2)) were used.

<2-5. Other Components>

The following components were used as other components.

Inorganic filler: calcium carbonate ("R-Jutan" manufactured by Maruo Calcium Co., Ltd. having a median diameter of 20 μm)

Polymerization inhibitor: hydroquinone

Curing agent: 328E (manufactured by Kayaku Akzo Corporation)

Curing accelerator: 8% by mass cobalt octylate (manufactured by Nihon Kagaku Sangyo Co., Ltd.)

<3. Preparation Of Resin Composition>

<3-1. Examples 1 to 6>

In Examples 1 to 6, the urethane acrylate (A-1), the bisphenol A type vinyl ester resin (B-1), and 0.015 parts by mass of hydroquinone as the polymerization inhibitor were dissolved in styrene. The added amount of each component is as shown in Table 1, and for the urethane acrylate (A-1) and the bisphenol A type vinyl ester resin (B-1), the amounts of solid content (that is, the amount excluding styrene, which is also applied to the comparative examples described later) are shown therein. The content of styrene (C-1) includes styrene as a solvent for the added urethane acrylate (A-1) and a solvent for the added bisphenol A type vinyl ester resin (B-1), and this is also applied to other examples and comparative examples.

Thereafter, the hollow body (D) having a size shown in Table 1, the inorganic filler, the curing agent, and the curing accelerator were further added to the obtained mixture in amounts shown in Table 1, and kneaded under a temperature condition of 30° C. using a double-arm kneader to obtain a resin composition of Examples 1 to 6.

<3-2. Example 7>

In Example 7, a resin composition was prepared by mixing components in the amounts shown in Table 1 in the same manner as in Example 1, except that the unsaturated polyester resin (B-2) was used instead of the bisphenol A type vinyl ester resin (B-1) as the unsaturated resin (B).

<3-3. Comparative Examples 1 to 5>

In Comparative Example 1, a resin composition was prepared in the same manner as in Example 1, using the same components as in Example 1 in the amounts shown in Table 1, except that the bisphenol A type vinyl ester resin (B-1) was not added. In Comparative Examples 2 to 4, resin compositions were prepared in the same manner as in Example 1 in the amounts shown in Table 1. In Comparative Example 5, a resin composition was prepared in the same manner as in Example 1, using the same components as in Example 1 in the amounts shown in Table 1, except that the urethane acrylate (A-1) was not added.

<4. Evaluation Method Of Resin Composition>

<4-1. Preparation of Sample for Evaluation>

Various evaluations described later were carried out using a polishing pad which was prepared using a resin composition as a sample for evaluation. The method for producing the sample for evaluation is the same with respect to Examples 1 to 7 and Comparative Examples 1 to 5. First, the resin composition was cast into a mold of 300×300×2 mm and cured. Curing was carried out under the condition of at 20° C. for 2 hours, followed by at 120° C. for 2 hours. The surface of the molded article (cured product) was roughened by grinding about 50 μm in thickness from the surface of the molded article (cured product) using a planar polisher (manufactured by Maruto Instrument Co., Ltd.), thereby forming in the surface thereof pores which is able to retain abrasive particles therein, to obtain a polishing pad for evaluation.

<4-2. Measurement of Barcol Hardness>

The hardness of the produced polishing pad was measured at 10 locations using a GYZJ935 manufactured by Barber Colman Company, and the mean value thereof was calculated as Barcol hardness.

<4-3. Evaluation of Pores>

The pores existing in the surface of the polishing pad were evaluated by observing the surface of the polishing pad using a microscope (VH-7000 type manufactured by Keyence Corporation). The average diameter of the pores was determined by measuring the diameters of 30 pores and averaging them. The standard deviation of measured diameters of 30 pores was also calculated to evaluate the pore size variation. The number of pores was determined by counting the number of pores existing within 1 mm square in the observed image.

TABLE 1

| | | | Examples | | | | | | |
|---|---|---|---|---|---|---|---|---|---|
| | | | 1 | 2 | 3 | 4 | 5 | 6 | 7 |
| Composition (parts by mass) | (A) Urethane (meth)acrylate | Urethane acrylate (A-1) | 45 | 45 | 45 | 35 | 45 | 45 | 45 |
| | (B) Unsaturated resin | Bisphenol A type vinyl ester resin (B-1) | 5 | 5 | 5 | 15 | 5 | 5 | — |
| | | Unsaturated polyester resin (B-2) | — | — | — | — | — | — | 5 |
| | (A):(B) (parts by mass ratio) | | 90:10 | 90:10 | 90:10 | 70:30 | 90:10 | 90:10 | 90:10 |
| | (C) Ethylenically unsaturated compound | Styrene (C-1) | 50 | 50 | 50 | 50 | 50 | 50 | 50 |
| | (C)/[(A) + (B)] × 100 (parts by mass ratio) | | 100 | 100 | 100 | 100 | 100 | 100 | 100 |
| | (D) Hollow body | Resin balloon (D-1) (70 μm) | 5.0 | 8.0 | 1.0 | 5.0 | — | 7.0 | 7.0 |
| | | Resin balloon (D-2) (120 μm) | — | — | — | — | 5.0 | — | — |
| | (D)/[(A) + (B) + (C)] × 100 (parts by mass ratio) | | 5.0 | 8.0 | 1.0 | 5.0 | 5.0 | 7.0 | 7.0 |
| | Inorganic filler | Calcium carbonate | 50 | 50 | 50 | 50 | 50 | 100 | 50 |

TABLE 1-continued

|  |  |  |  |  |  |  |  |  |  |
|---|---|---|---|---|---|---|---|---|---|
|  | [Inorganic filler]/[(A) + (B) + (C)] × 100 (parts by mass ratio) | | 50 | 50 | 50 | 50 | 50 | 100 | 50 |
|  | Curing agent | 328E | 1.0 | 1.0 | 1.0 | 1.0 | 1.0 | 1.0 | 1.0 |
|  | Curing accelerator | Cobalt octylate | 1.0 | 1.0 | 1.0 | 1.0 | 1.0 | 1.0 | 1.0 |
| Evaluation of polishing pad | Barcol hardness | | 21 | 12 | 32 | 35 | 18 | 19 | 25 |
|  | Evaluation of pores | Average diameter of pores [µm] | 80 | 80 | 80 | 80 | 120 | 80 | 80 |
|  |  | Standard deviation of diameter [µm] | 2.5 | 2.7 | 2.1 | 2.3 | 3.3 | 2.8 | 2.7 |
|  |  | Number of pores [pores/mm²] | 55 | 88 | 16 | 45 | 49 | 80 | 82 |

|  |  |  | Comparative Examples | | | | |
|---|---|---|---|---|---|---|---|
|  |  |  | 1 | 2 | 3 | 4 | 5 |
| Composition (parts by mass) | (A) Urethane (meth)acrylate | Urethane acrylate (A-1) | 60 | 30 | 45 | 45 | — |
|  | (B) Unsaturated resin | Bisphenol A type vinyl ester resin (B-1) | — | 20 | 5 | 5 | 55 |
|  |  | Unsaturated polyester resin (B-2) | — | — | — | — | — |
|  | (A):(B) (parts by mass ratio) | | 100:0 | 60:40 | 90:10 | 90:10 | 0:100 |
|  | (C) Ethylenically unsaturated compound | Styrene (C-1) | 40 | 50 | 50 | 50 | 45 |
|  | (C)/[(A) + (B)] × 100 (parts by mass ratio) | | 67 | 100 | 100 | 100 | 82 |
|  | (D) Hollow body | Resin balloon (D-1) (70 µm) | 5.0 | 5.0 | 0.5 | 10.0 | 5.0 |
|  |  | Resin balloon (D-2) (120 µm) | — | — | — | — | — |
|  | (D)/[(A) + (B) + (C)] × 100 (parts by mass ratio) | | 5.0 | 5.0 | 0.5 | 10.0 | 5.0 |
|  | Inorganic filler | Calcium carbonate | 50 | 50 | 50 | 50 | 50 |
|  | [Inorganic filler]/[(A) + (B) + (C)] × 100 (parts by mass ratio) | | 50 | 50 | 50 | 50 | 50 |
|  | Curing agent | 328E | 1.0 | 1.0 | 1.0 | 1.0 | 1.0 |
|  | Curing accelerator | Cobalt octylate | 1.0 | 1.0 | 1.0 | 1.0 | 1.0 |
| Evaluation of polishing pad | Barcol hardness | | 5 | 68 | 44 | 5 | >100* |
|  | Evaluation of pores | Average diameter of pores [µm] | 80 | 80 | 80 | 80 | 80 |
|  |  | Standard deviation of diameter [µm] | 2.4 | 2.5 | 1.3 | 2.9 | 2.4 |
|  |  | Number of pores [pores/mm²] | 49 | 53 | 10 | 116 | 61 |

*Not measurable

<5. Evaluation Results>

Evaluation results of the polishing pads prepared in Examples 1 to 7 and Comparative Examples 1 to 5 are shown in Table 1. As can be understood from Table 1, all of the polishing pads in Examples 1 to 7 have moderate hardness, and it can be understood that the size of the pores existing in the surface is maintained which substantially corresponds to the size of the added hollow body (D).

On the other hand, in Comparative Example 1 in which the unsaturated resin (B) was not added to the resin composition, hardness as a polishing pad was insufficient for precision polishing. The polishing pads made using the resin compositions of Comparative Example 2, in which the content of the urethane acrylate (A-1) with respect to the content of the bisphenol A type vinyl ester resin (B-1) was small, and Comparative Example 5, in which the urethane acrylate (A-1) was not used, were very hard and not suitable for chemical mechanical polishing. In Comparative Example 3, in which the added amount of the hollow body (D) in the resin composition was small, the number of pores was insufficient. On the contrary, in Comparative Example 4, in which the added amount of the hollow body (D) in the resin composition was excessive, hardness was insufficient for precision polishing.

From the above, it can be understood that a polishing pad having a hardness suitable for chemical mechanical polishing and having pores of a desired size can be easily obtained by a resin composition including a urethane (meth)acrylate (A) represented by the above general formula, an unsaturated resin (B) consisting of at least one of a vinyl ester resin and an unsaturated polyester resin, an ethylenically unsaturated compound (C) excluding the urethane (meth)acrylate (A) and the unsaturated resin (B), and a hollow body (D), wherein a mass ratio A:B of the content of the urethane (meth)acrylate (A) and the content of the unsaturated resin (B) is 64:36 to 96:4, and the content of the hollow body (D) with respect to 100 parts by mass of the total of the urethane (meth)acrylate (A), the unsaturated resin (B) and the ethylenically unsaturated compound (C) is 0.7 to 9.0 parts by mass.

The invention claimed is:

1. A resin composition comprising:
a urethane (meth)acrylate (A),
an unsaturated resin (B) consisting of at least one of a vinyl ester resin and an unsaturated polyester resin,
an ethylenically unsaturated compound (C) having an ethylenically unsaturated bond and excluding the urethane (meth)acrylate (A) and the unsaturated resin (B), and
a hollow body (D),
wherein the urethane (meth)acrylate (A) is represented by the following general formula,

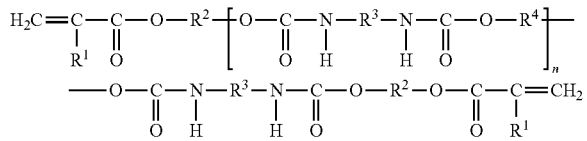

wherein $R^1$ is H or $CH_3$, $R^2$ is a divalent hydrocarbon group which may contain an ether bond and in which a hydrogen atom may be substituted with a substituent, $R^3$ is a divalent hydrocarbon group, and $R^4$ is a structural unit derived from a polyester polyol having a weight-average molecular weight of 2,000 to 8,000, and n, which is the number of repeating units, is an average value based on the number of the entire urethane (meth)acrylate (A) contained in the resin composition and is a real number of 1.00 or greater,
wherein a mass ratio A:B of the content of the urethane (meth)acrylate (A) and the content of the unsaturated resin (B) is 64:36 to 96:4, wherein the content of the hollow body (D) with respect to 100 parts by mass of the total of the urethane (meth)acrylate (A), the unsaturated resin (B) and the ethylenically unsaturated compound (C) is 0.7 to 9.0 parts by mass, wherein the value of n in the general formula is 1.00 to 6.00, and wherein the unsaturated resin (B) is an epoxy (meth)acrylate having a weight-average molecular weight of 1,000 to 6,000, or an unsaturated polyester resin having a weight-average molecular weight of 6,000 to 35,000.

2. The resin composition according to claim 1, wherein the hollow body (D) is a resin balloon.

3. The resin composition according to claim 1, wherein the content of the ethylenically unsaturated compound (C) is 40 to 200 parts by mass with respect to 100 parts by mass of the total of the urethane (meth)acrylate (A) and the unsaturated resin (B).

4. The resin composition according to claim 1, wherein $R^2$ in the general formula is an alkylene group having 2 to 6 carbon atoms.

5. The resin composition according to claim 1, wherein $R^3$ in the general formula is a cycloalkylene group or arylene group having 5 to 15 carbon atoms.

6. The resin composition according to claim 1, wherein the polyester polyol in $R^4$ of the general formula is a condensation product of an aliphatic glycol and an aliphatic dibasic acid.

7. The resin composition according to claim 1, wherein the unsaturated resin (B) is an epoxy (meth)acrylate.

8. The resin composition according to claim 1, wherein the resin composition comprises an inorganic filler excluding the hollow body (D).

9. The resin composition according to claim 8, wherein the content of the inorganic filler with respect to 100 parts by mass of the total of the urethane (meth)acrylate (A), the unsaturated resin (B), and the ethylenically unsaturated compound (C) is 10 to 200 parts by mass.

10. The resin composition according to claim 1, wherein the resin composition is a resin composition for a polishing pad.

11. A polishing pad comprising a cured product of a resin composition described in claim 1.

12. A method for producing a polishing pad comprising the steps of molding and curing a resin composition described in claim 1, and scraping a surface of the cured resin composition.

13. The resin composition according to claim 1, wherein the ethylenically unsaturated compound (C) is styrene.

14. The resin composition according to claim 8, wherein the inorganic filler is calcium carbonate, aluminum hydroxide or a combination thereof.

15. The resin composition according to claim 1, further comprising a curing agent and a curing accelerator.

* * * * *